United States Patent
Lee et al.

(10) Patent No.: US 7,366,178 B2
(45) Date of Patent: Apr. 29, 2008

(54) METHOD AND APPARATUS FOR SCHEDULING DATA PACKET TRANSMISSION OVER A MULTIHOP WIRELESS BACKHAUL NETWORK

(75) Inventors: Seungjoon Lee, College Park, MD (US); Girija J. Narlikar, Basking Ridge, NJ (US); Gordon Thomas Wilfong, Bedminster, NJ (US); Yihao Lisa Zhang, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 399 days.

(21) Appl. No.: 11/225,516

(22) Filed: Sep. 13, 2005

(65) Prior Publication Data

US 2007/0058604 A1    Mar. 15, 2007

(51) Int. Cl.
*H04J 1/02* (2006.01)
(52) U.S. Cl. .................. 370/395.4; 370/329; 370/348; 370/468; 455/450; 455/464
(58) Field of Classification Search ................ 370/321, 370/329, 345, 347–349, 395.4, 431, 437, 370/442, 458, 468; 455/450, 451, 453, 464
See application file for complete search history.

(56) References Cited

U.S. PATENT DOCUMENTS

| | | | | |
|---|---|---|---|---|
| 7,233,584 B2* | 6/2007 | Nguyen et al. | ............. | 370/337 |
| 2003/0176193 A1* | 9/2003 | Konishi et al. | ............. | 455/454 |

OTHER PUBLICATIONS

Aguayo, D. et al., Link-level measurements from an 802.11b Mesh Network. In *Proceedings of ACM SIGCOMM*, Aug. 2004.
Lichun, B. et al., Transmission Scheduling in Ad Hoc Networks with Directional Antennas. In *Proceedings of ACM MobiCom*, pp. 48-58, New York, Sep. 2002.
Chambers, B.A., The Grid Roofnet: A Rooftop Ad Hoc Wireless Network. Master's thesis, Massachusetts Institute of Technology, May 2002. http://www.pdos.lsc.mit.edu/grid/pubs.html.
Chandra, R. et al., Optimising the placement of integration points in multi-hop wireless networks. In *Proceedings of IEEE ICNP*, Oct. 2004.

(Continued)

*Primary Examiner*—William Trost
*Assistant Examiner*—James D Ewart
(74) *Attorney, Agent, or Firm*—Kenneth M. Brown (57) ABSTRACT

A method and apparatus for scheduling the transmission of data packets over a multihop wireless backhaul network in which delay guarantees through the network may be advantageously ensured. Illustratively, a novel packet scheduling scheme is provided which is advantageously based on an existing scheduling policy for wireline networks and for which a delay guarantee (based on the delay characteristics of the existing scheduling policy) can be advantageously ensured. In one embodiment, an even-odd link activation framework is defined for a given multihop wireless backhaul network, and an associated scheduling policy based on an arbitrary existing scheduling policy for wireline networks is derived and adopted. In such a case, the derived scheduling policy, when applied to the given multihop wireless backhaul network, advantageously ensures a worst-case delay guarantee of approximately twice that of the existing scheduling policy for wireline networks.

20 Claims, 6 Drawing Sheets

OTHER PUBLICATIONS

Chlamtac, I. et al., Making transmission schedules immune to topology changes in multi-hop packet radio networks, *IEEE/ACM Transactons on Networking*, 2(1):23-29, 1994.

Choudhury, R.R. et al., Using directional antennas for medium access control in ad hoc networks. In *Proceedings of ACM MobiCom*, pp. 59-70, 2002.

Gambiroza, V. et al., End-to-end performance and fairness in multihop wireless backhaul networks. In *Proceedings of ACM MobiCom*, pp. 287-301, 2004.

Huang, X.L. et al., On max-min fairness and scheduling in wireless ad-hoc networks: analytical framework and implementation. In *Proceedings of ACM MobiHoc*, pp. 221-231, 2001.

Jain, K. et al., Impact of Interference on Multi-hop Wireless Network Performance. In *Proceedings of ACM MobiCom*, pp. 66-80, 2003.

Ju, J-H. et al., An optimal topology-transparent scheduling method in multihop packet radio networks. *IEEE/ACM Transactions on Networking*, 6(3):298-306, 1998.

Kanodia, V. et al., Distributed multi-hop scheduling and medium access with delay and throughput constraints. In *Proceedings of ACM MobiCom*, 2001.

Karrer, R. et al. Enabling Large-scale Wireless Broadband: The Case for TAPs. In *2nd Workshop on Hot Topics in Networks (HotNets-II)*, Cambridge, MA, Nov. 2003.

Kodialam, M. et al., Characterizing the achievable rates in multihop wireless networks. In *Proceedings of ACM MobiCom*, San Diego, CA, Aug. 2003.

Li, C. et al., Coordinated network scheduling: A framework for end-to-end services. In *Proceedings of IEEE ICNP*, Osaka, Japan, Nov. 2000.

Luo, H. et al., Self-coordinating localized fair queueing in wireless ad hoc networks. *IEEE/ACM Transactions on Mobile Computing*, 3(1):86-98, Jan.-Feb. 2004.

Luo, H. et al., A new model for packet scheduling in multihop wireless networks. In *Proceedings of ACM MobiCom*, pp. 76-86, 2000.

Ramanathan, R., On The Performance of Ad Hoc Networks Using Beamforming Antennas. In *Proceedings of ACM MobiHoc*, Long Beach, California, USA, Oct. 2001.

Ramanathan, S., A Unified Framework and Algorithm for Channel Assignment in Wireless Networks. In *Proceedings IEEE INFOCOM*, Kobe, Japan, 1997.

Viswanathan, H. et al., Performance of Cellular networks with relays and centralized scheduling. In *Vehicular Technology Conference, VTC 2003-Fall*, pp. 1923-1928, 2003.

* cited by examiner (A)  (B)

METHOD AND APPARATUS FOR SCHEDULING DATA PACKET TRANSMISSION OVER A MULTIHOP WIRELESS BACKHAUL NETWORK

FIELD OF THE INVENTION

The present invention relates generally to the field of wireless access technologies and in particular to a method and apparatus for scheduling the transmission of data packets over a multihop wireless backhaul network.

BACKGROUND OF THE INVENTION

Wireless access technologies such as 802.11x and 3G/4G, each of which is fully familiar to those skilled in the art, have been providing steadily improving data rates at steadily reduced costs, thereby paving the way for ubiquitous, high-speed broadband wireless coverage. The biggest challenge in making this vision a reality, however, is to cost effectively connect all of the access points (e.g., cellular base stations) to the Internet using some backhaul technology. Current backhaul technologies such as T1 or DSL lines (each of which is fully familiar to those skilled in the art) are fast becoming a bottleneck as access speeds rise, and faster wired technologies such as T3 or fiber connections (also each fully familiar to those skilled in the art) can be expensive to lease or install in a number of scenarios.

With the technical improvements and standardization of long-haul, non-line-of-sight (NLOS) wireless technologies such as, for example, WiMAX (also known as 802.16d or 802.16-2004, and also fully familiar to those skilled in the art), the use of a wireless backhaul network is quickly becoming a cost effective alternative to wired interconnection-based technologies. The recent standardization of the WiMAX technique is expected to drive down prices of WiMAX-compliant hardware, making it possible for service providers to extensively deploy WiMAX-based backhaul links at competitive costs. The added benefits of a wireless backhaul include ease of deployment (i.e., since there is no need to run wires) and the ability to bypass an incumbent wireline carrier's networks. Furthermore, with spectral availability widening globally (especially, for example, in the 5 GHz range) standardized wireless backhaul equipment can now be deployed in a large number of locations.

Wireless backhaul networks will be useful to provide high speed Internet access to residential, small and medium business customers, as well as Internet access for WiFi hot spots and cellular base stations. (The WiFi standard communications protocol is also fully familiar to those skilled in the art.) Public safety services and private networks could also be advantageously built using wireless backhaul links. In particular, multihop wireless architectures for backhaul have the potential to provide ubiquitous, high-speed wireless access to consumers. (As is fully familiar to those skilled in the art, a multihop wireless architecture permits more than one wireless connection or "hop" from a wireless terminal to a wired "gateway.") In principle, multihop wireless networks are easy to deploy and expand incrementally, can adjust to failures or changing traffic demands by reconfiguring backhaul routes, and can provide ubiquitous service, especially in areas with no installed wired base. Furthermore, multihopping allows one to reduce the distances over which the access points need to transmit on the backhaul links. This can help increase network throughput due to lower path loss and better spatial reuse.

Figure 1:
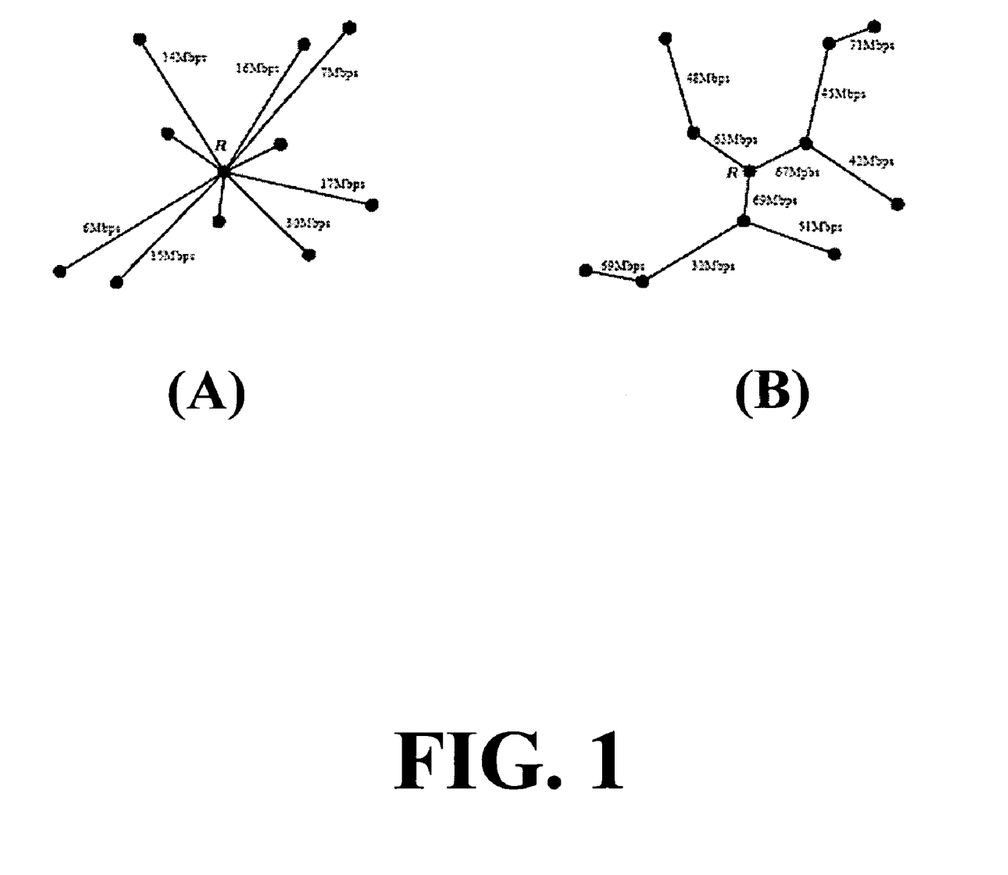
FIG. 1 shows a sample of a one-hop wireless backhaul network (FIG. 1A) and an equivalent multihop wireless backhaul network (FIG. 1B).

FIG. 1 shows a sample of a one-hop wireless backhaul network (FIG. 1A) and an equivalent multihop wireless backhaul network (FIG. 1B). As can be seen in the figure, both networks connect the same ten access points to a single wired access point R. However, the above-described advantages apply to the multihop wireless backhaul network of FIG. 1B as compared to the one-hop wireless backhaul network of FIG. 1A.

Recent commercial deployments of such multihop wireless or "mesh" backhauls in the real world are beginning to demonstrate some of these advantages. However, several challenges remain in allowing multihop wireless backhaul networks to match the throughput and more particularly the delay guarantees of wired backhaul networks. As is well known to those skilled in the art, multihopping can help boost throughput, but the transmission of packets through the network must now be more carefully scheduled to reduce interference and maintain low delays over multiple hops. In particular, providing guaranteed rates while keeping end-to-end delays low is extremely important for any backhaul network that will carry delay sensitive traffic (such as, for example, Voice Over IP, video and interactive applications).

SUMMARY OF THE INVENTION

In accordance with various illustrative embodiments of the present invention, a method and apparatus for scheduling the transmission of data packets over a multihop wireless backhaul network is provided in which delay guarantees through the network may be advantageously ensured. In particular, according to certain ones of these illustrative embodiments of the invention, a novel packet scheduling scheme is provided which is advantageously based on an existing scheduling policy for wireline networks and for which a delay guarantee (based on the delay characteristics of the existing scheduling policy) can be advantageously ensured.

In accordance with one illustrative embodiment of the present invention, an even-odd link activation framework is defined for a given multihop wireless backhaul network, and an associated scheduling policy based on an arbitrary existing scheduling policy for wireline networks is derived and adopted. In such a case, the derived scheduling policy, when applied to the given multihop wireless backhaul network, advantageously ensures a worst-case delay guarantee approximately twice that of the existing scheduling policy for wireline networks.

DETAILED DESCRIPTION OF THE ILLUSTRATIVE EMBODIMENTS

Introduction

In accordance with an illustrative embodiment of the present invention, a simple yet generalized link activation framework, which will be referred to herein as the even-odd framework, is provided for scheduling packets over a wireless backhaul network. The even-odd framework advantageously activates each communications link of the network in alternate timeslots, and applies subchannelization to adjust link bandwidths and to allow access points to receive data simultaneously over multiple links (i.e., from multiple sources). (The term "subchannelization" as used herein means the use of different available subchannels associated with a given communications channel—see below.) In accordance with an illustrative embodiment of the present invention, the even-odd framework advantageously allows for the elimination of interference and allows one to map a wireless backhaul into an equivalent, half-idle wireline network. As a result, any existing wireline scheduling policy may be advantageously implemented "locally" at each access point in the wireless backhaul.

An Illustrative Network Model

Assume that we are given a set of access points V, also called nodes, that need to be connected by a wireless backhaul, along with a set of uplink (to the Internet) and downlink (from the Internet) demands for each access point. Direct, backhaul connections between access points may be specified by a set E of directed links. Each pair of access points is connected by a directed link $e \in E$, with a given channel rate C(e). The rate is advantageously computed assuming no interference from nearby transmissions, and depends on the distance and the environment between its two end points. One of the access points, $R \in V$ is referred to as the "gateway" and represents, for example, a direct, high-speed wired connection to the Internet. The remaining access points are assumed to communicate with the gateway via the wireless backhaul network to send data to and receive data from the Internet.

Note that, in general, a wireless backhaul network may have more than one gateway for higher redundancy and capacity, with each access point being connected to multiple gateways. In accordance with the illustrative embodiments of the present invention described in detail herein, it is assumed that the problem is limited to that of scheduling and routing to and from a single gateway. However, in accordance with other illustrative embodiments of the present invention, the model and the techniques described herein can be extended to handle multiple gateways. For example, if the traffic to and from different gateways can operate in well separated frequency bands or disjoint timeslots, the problem of routing and scheduling for multiple gateways can be reduced to routing and scheduling for each gateway separately. Alternatively, a simple construction can be used to show that we can transform such a network into an equivalent one with only one gateway. In particular, a dummy gateway D and disjoint length one and length two paths from D to each real gateway are added to the original network. (Note that the reason for adding two paths for each gateway is to ensure that the even/odd parity of all the gateways is not forced to be the same.) The links on these new added paths are all advantageously given infinite capacity. Then the new network can be treated exactly as one with just one gateway D.

For purposes of the discussion herein, and in accordance with the illustrative embodiments of the present invention described herein, assume that the backhaul wireless links between neighboring access points use the WiMAX (802.16d) standard (or some similar longhaul NLOS technology), with links communicating in the time division duplex (TDD) mode, which is fully familiar to those skilled in the art. Further, the MAC (Media Access Control) layer (as in 802.16d) is assumed to schedule data to multiple receivers across timeslots using conventional time division multiple access (TDMA) techniques, fully familiar to those skilled in the art. In accordance with the illustrative embodiments of the present invention, the use of subchannelization within a timeslot is advantageously employed to avoid interference. Subchannelization allows the available spectrum to be subdivided into multiple orthogonal subchannels such as, for example, subcarriers in an OFDM system or spreading codes in a CDMA system, so that multiple separate data streams can be received in the same timeslot over separate subchannels at the same or nearby receivers with no interference. (OFDM, or "Orthogonal Frequency Division Multiple Access," and CDMA, or "Code Division Multiple Access," are wireless coding technologies which are fully familiar to those skilled in the art. Note that 802.16d currently supports subchannelization in units of 1, 2, 4, 8, or 16 OFDM subcarriers in the uplink.) Since both endpoints of a link in the wireless backhaul are static, it may be assumed that the channel experiences negligible fast fading; however, the channels may experience shadow fading.

Also in accordance with the illustrative embodiments of the present invention described herein, access traffic from the users to their respective access points is advantageously assumed to be transmitted in a separate frequency band, and assumed not to interfere with the wireless backhaul traffic. It is also assumed that all backhaul transmissions take place over a contiguous frequency band. Therefore, an access point will advantageously not transmit and receive at the same time even if it uses different subchannels for the transmitted and received signals. (Note that due to the spectral proximity of the subchannels, the transmitted signal will likely drown out the received signal at an access point.) Conventional interference models are advantageously augmented with subchannelization, such that an access point can simultaneously receive from multiple neighbors without interference as long as the received signals use different subchannels.

Note that in accordance with the illustrative embodiments of the present invention described herein, separate links in the backhaul may interfere with each other, depending on the locations of their receiving end points and the antenna technology used for transmission and reception. Such pairs of directed links that are advantageously not simultaneously active in the illustrative backhaul networks can be advantageously pre-computed. Therefore, it may be advantageously assumed that interfering link pairs are specified as input.

Also note that there are two types of potential interference in the illustrative backhaul networks of the described embodiments of the invention: (a) self-interference that may prevent a single access point from simultaneously transmitting and receiving, or from simultaneously receiving from multiple neighbors on the same subchannel; and (b) cross-link interference, caused by transmissions using the same subchannel over two separate links with distinct receivers that are located close to each other. Together, the routing and scheduling components of the wireless backhaul design of the illustrative embodiments of the present invention advantageously aim to avoid such interference while maximizing throughput and minimizing delay.

In accordance with the illustrative embodiments of the present invention, the routing component finds routes for each access point to and from the gateway. Given the set of routes, the scheduling component advantageously supplies two parts: (a) a link activation scheme that specifies the set of directional links that are active at each timeslot along with the set of subchannels they use, and (b) a scheduling policy that determines the set of packets to be transmitted along an active link(s) at each time slot. Advantageously, the latter decision may be made locally at each access point, without requiring any additional communication between access points. In contrast, neighboring access points advantageously agree on a link activation schedule, and a centralized link activation scheme may be deemed acceptable as long as it does not change very often.

An Illustrative Link Activation Framework

In accordance with various illustrative embodiments of the present invention, a link activation framework is provided which advantageously enables local scheduling of packets such that interference is avoided, while the end-to-end delay experienced by all of the connections is advantageously minimized. One such illustrative embodiment of the present invention comprises a simple link activation scheme which will be referred to herein as the even-odd scheme. Specifically, the even-odd scheme advantageously allows directed links to be activated in alternating timeslots. Also in accordance with this illustrative embodiment of the present invention, conditions for admissible traffic are specified such that the backhaul network is not overloaded by the given connections under the even-odd scheme.

Assume that each node of the backhaul network has been labeled as either an "even" or an "odd" node. This labeling may, for example, be advantageously performed during the design of the backhaul network, which is advantageously constructed in such as a manner as to ensure that every route contains alternately labeled nodes. Thus whenever a link is activated in such a backhaul network it necessarily connects an even node and an odd node. In accordance with the illustrative embodiment of the present invention, each link (u, v)—namely a link from node u to node v—is labeled as "odd" if node u is odd, and labeled as an "even" link otherwise. Thus, by definition, all valid routes through the network consist of links of alternating labels.

The even-odd scheduling framework in accordance with the illustrative embodiment of the present invention uses a simple link activation scheme—each directed link is active during each alternate timeslot. That is, all even links are advantageously active during the even timeslots, while all odd links are advantageously active during the odd timeslots.

Figure 2:
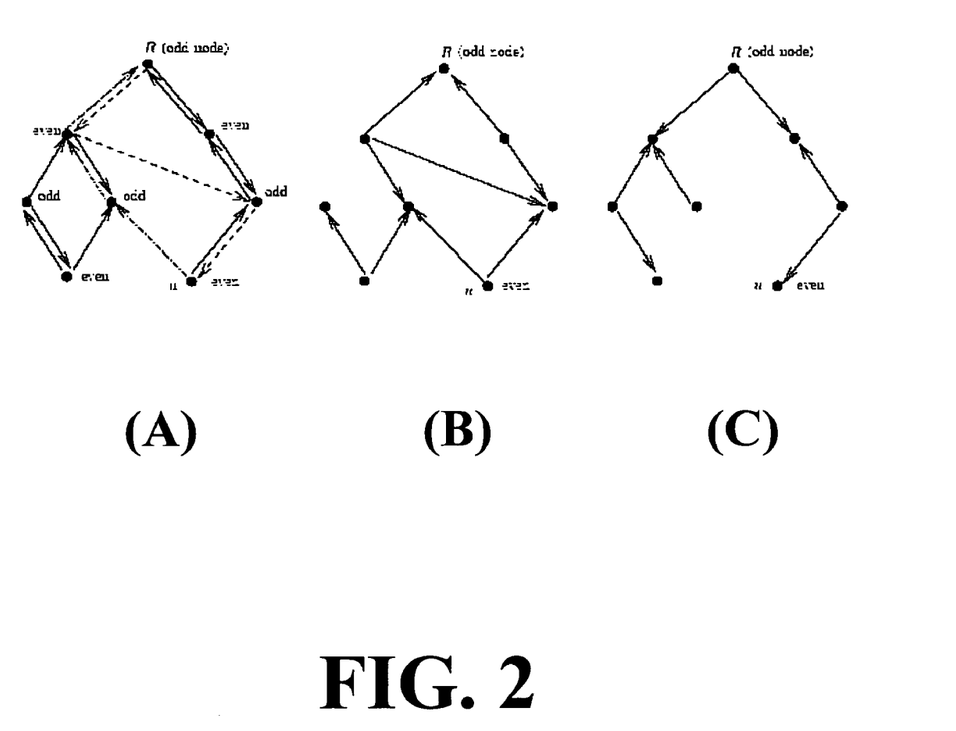
FIG. 2 shows an even-odd scheduling framework for a sample wireless backhaul network topology together with an even-odd link activation scheme in accordance with an illustrative embodiment of the present invention.

FIG. 2 shows an even-odd scheduling framework for a sample wireless backhaul network topology together with an even-odd link activation scheme in accordance with an illustrative embodiment of the present invention. FIG. 2A shows a sample network topology together with possible valid uplink and downlink routes for a sample node u. (The uplink route is shown in dash-dotted lines and the downlink route is shown in dashed lines.) FIG. 2B shows the links which are advantageously active during all even timeslots according to the illustrative embodiment of the invention, and FIG. 2C shows the links which are advantageously active during all odd timeslots according to the illustrative embodiment of the invention.

More specifically, consider the "even" node u as shown in the figure. At each even timeslot, node u is advantageously transmitting to its neighbors, since links from u to its neighbors are all labeled as odd nodes. Therefore, u is said to be in the "transmitting mode." At each odd timeslot, on the other hand, u is advantageously receiving data from its neighbors. Therefore, u is said to be in the "receiving mode." Similarly, odd nodes are advantageously in the transmitting mode during each odd timeslot, and in the receiving mode during each even timeslot. Thus, whenever a new access point joins the backhaul network, it is advantageously assigned a label along with uplink and downlink routes connecting it to the gateway.

As discussed above, in accordance with an illustrative embodiment of the present invention, each node is advantageously assigned subchannels for its incoming and outgoing links. In particular, since a node in the receiving mode may receive data from multiples neighbors simultaneously, each of these transmissions advantageously uses disjoint subchannels. Similarly, a node in transmitting mode advantageously uses disjoint subchannels to transmit data to its neighbors. The assignment of subchannels to each node in the receiving mode and in the transmitting mode is conventional and will be obvious to those of ordinary skill in the art.

Self-interference, that is, interference between link pairs that share a node, is advantageously eliminated in accordance with the above-described illustrative embodiment of the present invention with a combination of even-odd link activation and subchannelization. That is, the even-odd scheme prevents a node from simultaneously transmitting and receiving, while subchannelization ensures that simultaneous receptions to and transmissions from a single node do not interfere with each other. Therefore, only link pairs that do not have a node in common could possibly interfere. Such cross-link interference may be advantageously eliminated by ensuring that no two links that interfere are assigned the same even-odd label—thus, links with cross-link interference will not be active simultaneously.

An Illustrative Scheduling Policy

In accordance with an illustrative embodiment of the present invention, the following assumptions are used. All links in the backhaul network are advantageously treated as directed links, wherein each link has a buffer at the head of the link. Packets are queued in these buffers when waiting to be transmitted. The scheduling policy determines the order in which packets leave each buffer. It may be assumed that the scheduler makes scheduling decisions continuously. Whenever a link finishes servicing a packet, the scheduler advantageously decides which packet to service next. A packet is eligible for scheduling if the entire packet has arrived in the buffer. If a link becomes inactive before an entire packet is serviced, the remainder of the packet waits in the queue and is serviced once the link is active again. We will use $\tau$ to denote the duration of a timeslot, and will assume zero propagation delay on each link since it is negligibly small.

As described above, under the even-odd link activation scheme in accordance with the illustrative embodiment of the present invention, odd links are active during odd time slots, where odd links are defined to be outgoing links of odd nodes, and even links are active during even time slots, where even links are defined to be outgoing links of even nodes. Thus each link is advantageously active approximately half of the time and idle during the other half of the time—thus, we will refer to this type of system as a "half-idle" system.

Note that many conventional scheduling policies have been employed in traditional wireline networks in which links are active essentially all of the time. In accordance with an illustrative embodiment of the present invention, any of these conventional wireline scheduling policies may be advantageously applied to a mutihop wireless backhaul network by an illustrative "conversion" process. In particular, such policies may be advantageously applied to the above-described even-odd framework by first introducing a new "imaginary" wireline network $N_I$ having the same topology and effective link capacities as the given wireless network N.

Then, given this imaginary wireline network, any scheduling policy may be advantageously applied to the wireless backhaul system in accordance with the illustrative embodiment of the present invention. In particular, the times at which packets leave a buffer in the imaginary system advantageously define the times at which packets leave a buffer in the "real" wireless system. Specifically, the mapping in accordance with the illustrative embodiment of the present invention operates as follows.

The arrivals during two consecutive timeslots to the real system are mapped to one timeslot to the imaginary system. In particular, the arrivals during timeslots 2t and 2t+1 in the real system (where t is an arbitrary integer value) are mapped to timeslot t in the imaginary system. This effectively "squeezes" the half-idle wireless system into a fully-loaded imaginary system. Then a scheduling policy is advantageously applied to the imaginary system. Specifically, if a packet leaves a link in $N_I$ during a timeslot t', then the packet leaves the same link in N during timeslot 2t'+2 or 2t'+3, depending on whether the given link is active during an even timeslot or during an odd timeslot. It can be easily shown that this actually spreads out the departure times of the packets in a feasible way—that is, the links in the real system can indeed service all the packets according to these departure times. (Note, therefore, that as long as the scheduling policy has some end-to-end delay guarantee in the imaginary system, it also has a delay guarantee in the real system which roughly doubles the bound.)

Figure 3:
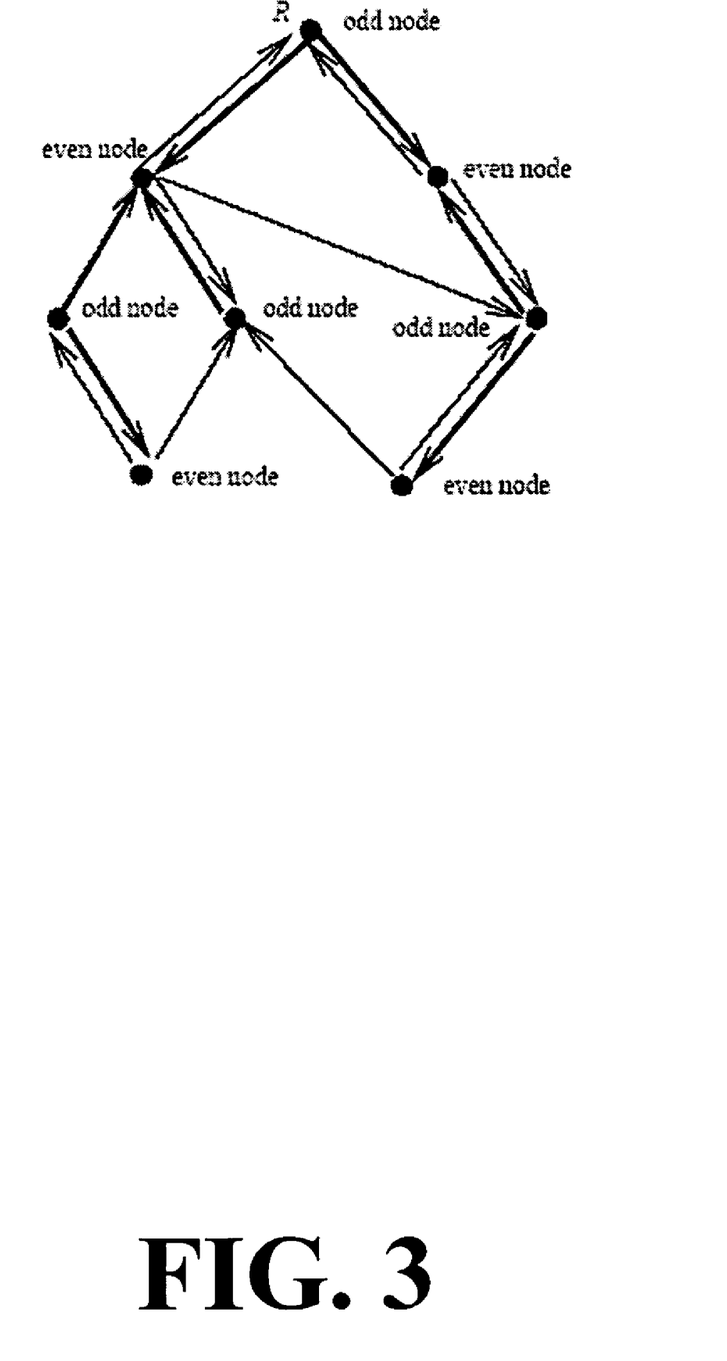
FIG. 3 shows an illustrative "imaginary" network for the sample wireless backhaul network topology of FIG. 2 constructed in accordance with an illustrative embodiment of the present invention.

In accordance with the illustrative embodiment of the present invention, the imaginary system $N_I$ advantageously comprises the real network N with a propagation delay equal to τ added to every odd link and zero propagation delay added to every even link. FIG. 3, for example, shows an illustrative imaginary network for the sample wireless backhaul network topology of FIG. 2 constructed in accordance with an illustrative embodiment of the present invention. Thick links shown in the figure represent odd links with propagation delay τ and thin links represent even links with propagation delay zero. Recall that τ is also the duration of a timeslot. Thus, if a link has propagation delay g, then after the link completely services a packet p it takes time g for p to traverse the link. Once the link completes servicing p it can start servicing the next packet without waiting for the propagation time of g. (Recall also that it is assumed herein that the real system has zero propagation delay on all links.)

In addition, each link e in $N_I$ is advantageously assigned a link capacity equal to its effective capacity in the real network N.

Figure 4:
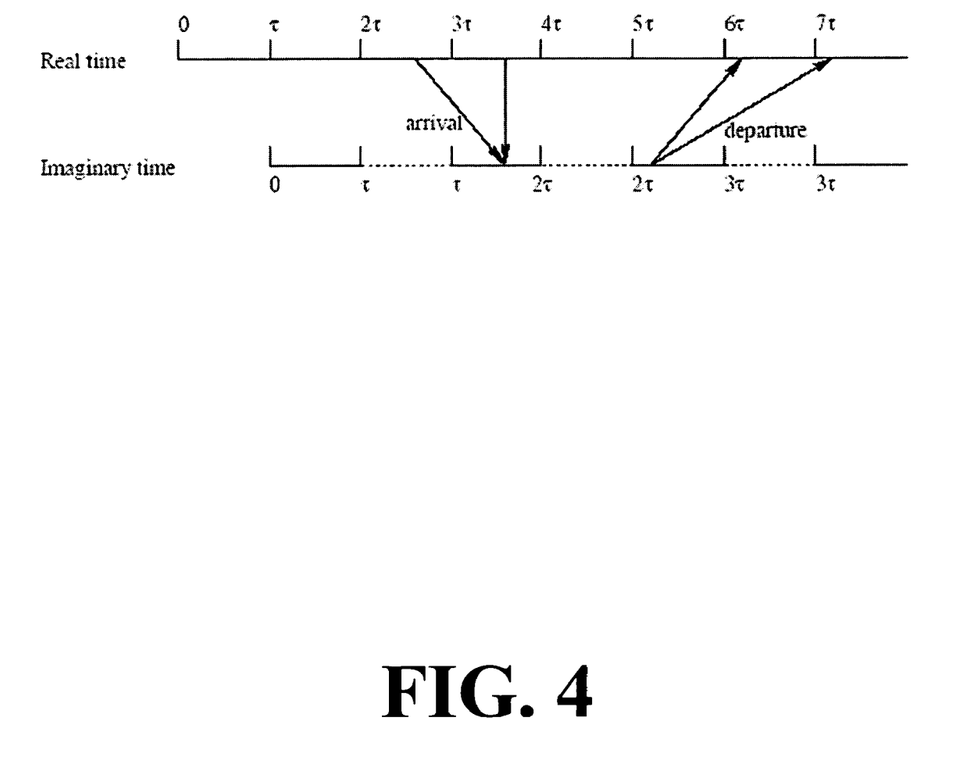
FIG. 4 shows a timing relationship between the clock of an imaginary network and its corresponding real network in accordance with an illustrative embodiment of the present invention.

FIG. 4 shows a timing relationship between the clock of an imaginary network (e.g., $N_I$) and its corresponding real network (e.g., N) in accordance with an illustrative embodiment of the present invention. Specifically, as shown in the figure, the imaginary clock starts at real time τ and is advantageously turned off every other timeslot of duration τ. More particularly, during real time intervals [τ, 2τ), [3τ, 4τ), etc., the imaginary clock is advantageously turned on, while during real time intervals [0, τ), [2τ, 3τ), etc., the imaginary clock is advantageously turned off. (In the figure, dotted intervals on the imaginary time line represents periods when the imaginary time is turned off.)

Next, in accordance with the illustrative embodiment of the present invention, the connections of the imaginary system $N_I$ are advantageously defined as follows. (A "connection" is defined herein to consist of a source node, a sink node and a description of a packet arrival at the source node. Note that in a backhaul network, either the source node or the sink node is the gateway, depending on whether the transmission is an uplink transmission or a downlink transmission.) Each connection in $N_I$ follows a path identical to that in N. Suppose that a packet arrives at its source node in the real network N at real time a=n·τ+α, where α=a (mod τ). Then, in accordance with the illustrative embodiment of the present invention, the corresponding packet in the imaginary network $N_I$ advantageously arrives at imaginary time $a_I=\lfloor n/2 \rfloor·τ+α$. The two downward arrows shown in FIG. 4 illustrate this relationship. Note that at any imaginary time $t_I$, all packets with arrival times $a_I<t_I$ have already arrived in the real system. Therefore, any conventional scheduling policy may be advantageously used to schedule the imaginary system. We will refer to this scheduling policy as $S_I$.

Finally, in accordance with the illustrative embodiment of the present invention, a scheduling policy S is defined for the real system which is advantageously based on the scheduling decisions made by $S_I$ for the imaginary system. Suppose a packet starts to leave the buffer at a link e of $N_I$ at imaginary time $d_I=n·τ+δ$, where $δ=d_I$ (mod τ). Then, in accordance with the illustrative embodiment of the present invention, the corresponding packet starts to leave the buffer of link e in N at real time d, where d=(2n+2)·τ+δ, if e is active at even timeslots, and where d=(2n+3)·τ+δ, if e is active at odd timeslots.

The two upward arrows shown in FIG. 4 illustrate this relationship. Note that, in accordance with the illustrative embodiment of the present invention, if the link becomes inactive before an entire packet is serviced, the remainder of the packet advantageously stays in the buffer and is serviced once the link becomes active again. This, therefore, defines an illustrative scheduling policy S for the real system which advantageously corresponds to the scheduling policy $S_I$ as described above for the corresponding imaginary system.

Figure 5:
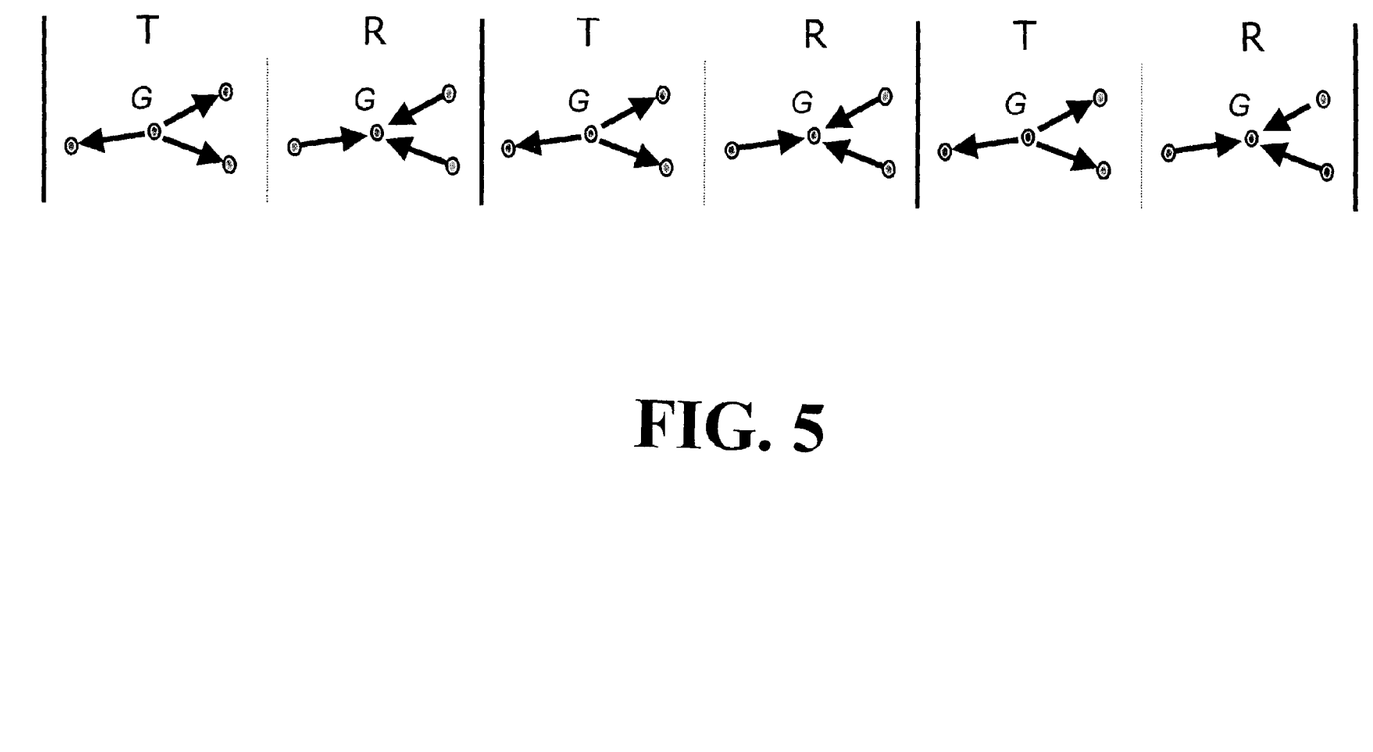
FIG. 5 shows an illustrative operation of a node in a sample wireless backhaul network topology in which an even-odd scheduling framework together with an even-odd link activation scheme has been employed in accordance with an illustrative embodiment of the present invention.

FIG. 5 shows an illustrative operation of a node in a sample wireless backhaul network topology in which an even-odd scheduling framework together with an even-odd link activation scheme has been employed in accordance with an illustrative embodiment of the present invention. As can be seen in the figure, sample node G transmits data packets to each of three nodes during the time slots labeled "T" (the "odd" time slots) and receives data packets from each of these three nodes during the time slots labeled "R" (the "even" time slots). This alternating process advantageously repeats indefinitely.

An Alternative Illustrative Link Activation Framework and Scheduling Policy

Figure 6:
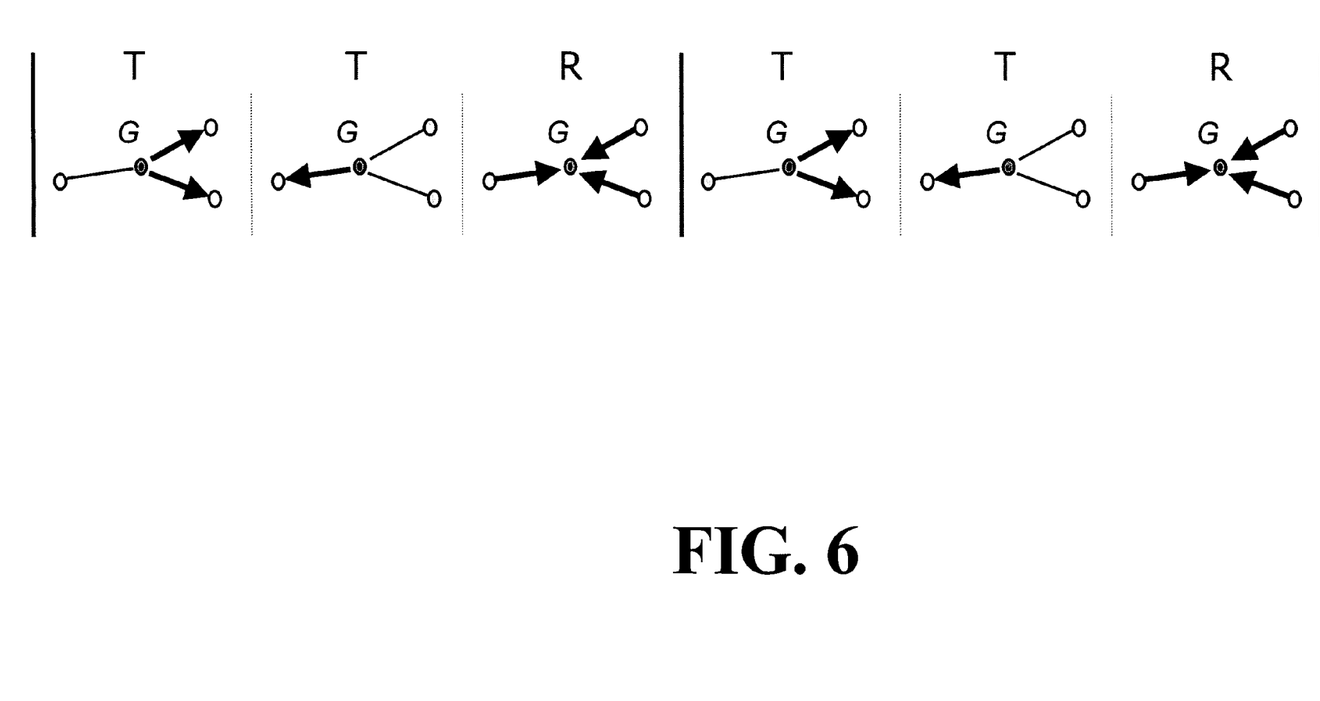
FIG. 6 shows an illustrative operation of a node in a sample wireless backhaul network topology in which an extension of the even-odd scheduling framework and the even-odd link activation scheme has been employed in accordance with another illustrative embodiment of the present invention.

FIG. 6 shows an illustrative operation of a node in a sample wireless backhaul network topology in which an extension of the even-odd scheduling framework and the even-odd link activation scheme has been employed in accordance with another illustrative embodiment of the present invention. Note first that in accordance with the illustrative embodiment of the present invention described above (the even-odd scheduling framework and link activation scheme), it is possible that there may be asymmetric traffic conditions which result in under-utilized network links.

Therefore, in accordance with another illustrative embodiment of the present invention as shown in FIG. 6, multiple transmitting and/or receiving slots are permitted within each cycle of the alternating process. In particular, the example of FIG. 6 shows a repeating cycle having three time slots, rather than the two (i.e., "even" and "odd") of the illustrative embodiment of FIG. 5. In this manner, one may advantageously trade off delay characteristics for increased throughput.

For example, sample node G, in accordance with the other illustrative embodiment of the present invention and shown in FIG. 6, transmits data packets to two of the three nodes connected thereto during the first time slot of each cycle (labeled "T"), transmits data packets to the other one of the three nodes connected thereto during the second time slot of each cycle (also labeled "T"), and then receives data packets from each of these three nodes during the time slots labeled "R" (the third time slot of each cycle). This alternating process also advantageously repeats indefinitely in accordance with this other illustrative embodiment of the present invention.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

We claim:

1. A method for communicating data packets over a period of time in a wireless communications network, the wireless communications network comprising a plurality of nodes for transmitting data packets to and receiving data packets from other ones of said plurality of nodes, the plurality of nodes comprising at least a first subset of said nodes and a second subset of said nodes wherein said first subset of said nodes and said second subset of said nodes are disjoint sets, the period of time being divided into a plurality of non-overlapping time slots, the method comprising the steps of:

(a) transmitting, during a first one of said time slots, one or more of said data packets from one or more of said nodes in said first subset of said nodes, each of said data packets transmitted from said nodes in said first subset of nodes being transmitted to and being received by one of said nodes in said second subset of nodes, wherein (i) each of said nodes in said first subset of nodes transmitting one or more data packets during said first one of said time slots does not receive any data packets from any nodes comprised in said wireless communications network during said first one of said time slots, (ii) each of said nodes in said second subset of nodes receiving one or more data packets during said first one of said time slots does not transmit any data packets to any nodes comprised in said wireless communications network during said first one of said time slots, (iii) at least one of said nodes in said first subset of nodes transmits, during said first one of said time slots, a plurality of data packets to a corresponding plurality of said nodes in said second subset of nodes using a different subchannel for each of said nodes in said second subset of nodes to which said at least one of said nodes in said first subset of nodes transmits one or more data packets, and (iv) at least one of said nodes in said second subset of nodes receives, during said first one of said time slots, a plurality of data packets from a corresponding plurality of said nodes in said first subset of nodes using a different subchannel for each of said nodes in said first subset of nodes from which said at least one of said nodes in said second subset of nodes receives one or more data packets; and (b) transmitting, during a second one of said time slots subsequent to said first one of said time slots, one or more of said data packets from one or more of said nodes in said second subset of said nodes, each of said data packets transmitted from said nodes in said second subset of nodes being transmitted to and being received by one of said nodes in said first subset of nodes, wherein (i) each of said nodes in said second subset of nodes transmitting one or more data packets during said second one of said time slots does not receive any data packets from any nodes comprised in said wireless communications network during said second one of said time slots, (ii) each of said nodes in said first subset of nodes receiving one or more data packets during said second one of said time slots does not transmit any data packets to any nodes comprised in said wireless communications network during said second one of said time slots, (iii) at least one of said nodes in said second subset of nodes transmits, during said second one of said time slots, a plurality of data packets to a corresponding plurality of said nodes in said first subset of nodes using a different subchannel for each of said nodes in said first subset of nodes to which said at least one of said nodes in said second subset of nodes transmits one or more data packets during said second one of said time slots, and (iv) at least one of said nodes in said first subset of nodes receives, during said second one of said time slots, a plurality of data packets from a corresponding plurality of said nodes in said second subset of nodes using a different subchannel for each of said nodes in said second subset of nodes from which said at least one of said nodes in said first subset of nodes receives one or more data packets during said second one of said time slots.

2. The method of claim 1 wherein said first subset of nodes and said second subset of nodes together comprise all of said plurality of nodes in said wireless communications network.

3. The method of claim 1 wherein said plurality of non-overlapping time slots are continuous in time, and wherein steps (a) and (b) are each repeated in turn within successive time slots throughout said period of time, such that step (a) is performed within successively odd numbered timeslots and step (b) is performed within successively even numbered timeslots.

4. The method of claim 1 further comprising the step of:
(c) transmitting, during a third one of said time slots subsequent to at least said first one of said time slots, one or more of said data packets from one or more of said nodes in one of said first or second subset of said nodes which transmits one or more data packets to one or more nodes in said other one of said first or second subset of said nodes during one of said first or second ones of said time slots, to one or more other nodes in said other one of said first or second subset of nodes, wherein said plurality of non-overlapping time slots are continuous in time, and wherein said steps (a), (b) and (c) are each repeated in a given order over said plurality of said time slots throughout said period of time.

5. The method of claim 1 wherein said data packets transmitted by said nodes in said first subset of nodes during said first time slot and said data packets transmitted by said nodes in said second subset of nodes during said second time slot are scheduled based on a predetermined wireline network scheduling policy.

6. The method of claim 5 wherein said data packets transmitted by said nodes in said first subset of nodes during said first time slot and said data packets transmitted by said nodes in said second subset of nodes during said second time slot are scheduled based on said predetermined wireline network scheduling policy as applied to an imaginary wireline network topology based on a topology of said wireless communications network.

7. The method of claim 6 wherein
(i) each of said plurality of non-overlapping time slots are continuous and of a predetermined length of time,
(ii) steps (a) and (b) are continuously repeated in order throughout said period of time,
(iii) said data packets transmitted by said nodes in said first subset of nodes are scheduled to be transmitted in a selected one of said repetitions of step (a) based on when said data packets would have been scheduled to be transmitted by corresponding ones of said nodes in said first subset of nodes in said imaginary wireline network topology in accordance with said predetermined wireline network scheduling policy as applied to said imaginary wireline network topology, and
(iv) said data packets transmitted by said nodes in said second subset of nodes are scheduled to be transmitted in a selected one of said repetitions of step (b) based on when said data packets would have been scheduled to be transmitted by corresponding ones of said nodes in said second subset of nodes in said imaginary wireline network topology in accordance with said predetermined wireline network scheduling policy as applied to said imaginary wireline network topology.

8. The method of claim 1 wherein said wireless communications network comprises a mutihop wireless backhaul network, wherein one of said nodes comprised therein comprises a gateway to a wireline network, and wherein one or more of all other nodes comprised therein comprise wireless access points thereof.

9. The method of claim 8 wherein the wireline network comprises the Internet.

10. The method of claim 8 wherein the wireless communications network communicates with use of a WiMAX communications protocol.

11. A wireless communications network for communicating data packets over a period of time divided into a plurality of non-overlapping time slots, the wireless communications network comprising:
a plurality of nodes for transmitting data packets to and receiving data packets from other ones of said plurality of nodes, the plurality of nodes comprising at least a first subset of said nodes and a second subset of said nodes wherein said first subset of said nodes and said second subset of said nodes are disjoint sets;
means for transmitting, during a first one of said time slots, one or more of said data packets from one or more of said nodes in said first subset of said nodes, each of said data packets transmitted from said nodes in said first subset of nodes being transmitted to and being received by one of said nodes in said second subset of nodes, wherein
(i) each of said nodes in said first subset of nodes transmitting one or more data packets during said first one of said time slots does not receive any data packets from any nodes comprised in said wireless communications network during said first one of said time slots,
(ii) each of said nodes in said second subset of nodes receiving one or more data packets during said first one of said time slots does not transmit any data packets to any nodes comprised in said wireless communications network during said first one of said time slots,
(iii) at least one of said nodes in said first subset of nodes transmits, during said first one of said time slots, a plurality of data packets to a corresponding plurality of said nodes in said second subset of nodes using a different subchannel for each of said nodes in said second subset of nodes to which said at least one of said nodes in said first subset of nodes transmits one or more data packets, and
(iv) at least one of said nodes in said second subset of nodes receives, during said first one of said time slots, a plurality of data packets from a corresponding plurality of said nodes in said first subset of nodes using a different subchannel for each of said nodes in said first subset of nodes from which said at least one of said nodes in said second subset of nodes receives one or more data packets; and
means for transmitting, during a second one of said time slots subsequent to said first one of said time slots, one or more of said data packets from one or more of said nodes in said second subset of said nodes, each of said data packets transmitted from said nodes in said second subset of nodes being transmitted to and being received by one of said nodes in said first subset of nodes, wherein
(i) each of said nodes in said second subset of nodes transmitting one or more data packets during said second one of said time slots does not receive any data packets from any nodes comprised in said wireless communications network during said second one of said time slots, (ii) each of said nodes in said first subset of nodes receiving one or more data packets during said second one of said time slots does not transmit any data packets to any nodes comprised in said wireless communications network during said second one of said time slots, (iii) at least one of said nodes in said second subset of nodes transmits, during said second one of said time slots, a plurality of data packets to a corresponding plurality of said nodes in said first subset of nodes using a different subchannel for each of said nodes in said first subset of nodes to which said at least one of said nodes in said second subset of nodes transmits one or more data packets during said second one of said time slots, and (iv) at least one of said nodes in said first subset of nodes receives, during said second one of said time slots, a plurality of data packets from a corresponding plurality of said nodes in said second subset of nodes using a different subchannel for each of said nodes in said second subset of nodes from which said at least one of said nodes in said first subset of nodes receives one or more data packets during said second one of said time slots.

12. The wireless communications network of claim 11 wherein said first subset of nodes and said second subset of nodes together comprise all of said plurality of nodes in said wireless communications network.

13. The wireless communications network of claim 11 wherein said plurality of non-overlapping time slots are continuous in time, and wherein said means for transmitting during said first one of said time slots and said means for transmitting during said second one of said time slots are adapted to repeat transmitting in turn within successive time slots throughout said period of time, such that means for transmitting during said first one of said time slots is performed within successively odd numbered timeslots and said means for transmitting during said second one of said time slots is performed within successively even numbered timeslots.

14. The wireless communications network of claim 11 further comprising:

means for transmitting, during a third one of said time slots subsequent to at least said first one of said time slots, one or more of said data packets from one or more of said nodes in one of said first or second subset of said nodes which transmits one or more data packets to one or more nodes in said other one of said first or second subset of said nodes during one of said first or second ones of said time slots, to one or more other nodes in said other one of said first or second subset of nodes, wherein said plurality of non-overlapping time slots are continuous in time, and wherein said means for transmitting during said first one of said time slots, said means for transmitting during said second one of said time slots, and said means for transmitting during said third one of said time slots, are adapted to repeat transmitting in turn within successive time slots throughout said period of time.

15. The wireless communications network of claim 11 wherein said data packets transmitted by said nodes in said first subset of nodes during said first time slot and said data packets transmitted by said nodes in said second subset of nodes during said second time slot are scheduled based on a predetermined wireline network scheduling policy.

16. The wireless communications network of claim 15 wherein said data packets transmitted by said nodes in said first subset of nodes during said first time slot and said data packets transmitted by said nodes in said second subset of nodes during said second time slot are scheduled based on said predetermined wireline network scheduling policy as applied to an imaginary wireline network topology based on a topology of said wireless communications network.

17. The wireless communications network of claim 16 wherein (i) each of said plurality of non-overlapping time slots are continuous and of a predetermined length of time, (ii) said means for transmitting during said first one of said time slots and said means for transmitting during said second one of said time slots are adapted to repeat transmitting in turn within successive time slots throughout said period of time, (iii) said data packets transmitted by said nodes in said first subset of nodes are scheduled to be transmitted in a selected one of said repetitions of said means for transmitting during said first one of said time slots based on when said data packets would have been scheduled to be transmitted by corresponding ones of said nodes in said first subset of nodes in said imaginary wireline network topology in accordance with said predetermined wireline network scheduling policy as applied to said imaginary wireline network topology, and (iv) said data packets transmitted by said nodes in said second subset of nodes are scheduled to be transmitted in a selected one of said repetitions of said means for transmitting during said second one of said time slots based on when said data packets would have been scheduled to be transmitted by corresponding ones of said nodes in said second subset of nodes in said imaginary wireline network topology in accordance with said predetermined wireline network scheduling policy as applied to said imaginary wireline network topology.

18. The wireless communications network of claim 11 wherein said wireless communications network comprises a mutihop wireless backhaul network, wherein one of said nodes comprised therein comprises a gateway to a wireline network, and wherein one or more of all other nodes comprised therein comprise wireless access points thereof.

19. The wireless communications network of claim 18 wherein the wireline network comprises the Internet.

20. The wireless communications network of claim 18 wherein the wireless communications network communicates with use of a WiMAX communications protocol.

* * * * *